United States Patent
Rider et al.

(10) Patent No.: US 9,097,528 B2
(45) Date of Patent: Aug. 4, 2015

(54) MANAGING A DATACENTER USING MOBILE DEVICES

(75) Inventors: Eric Marshall Rider, San Jose, CA (US); Benjamin Trevor Kolin, Redwood City, CA (US); Karen Natalie Wong, San Carlos, CA (US)

(73) Assignee: VMware, Inc., Palo Alto, CA (US)

( * ) Notice: Subject to any disclaimer, the term of this patent is extended or adjusted under 35 U.S.C. 154(b) by 886 days.

(21) Appl. No.: 12/718,388

(22) Filed: Mar. 5, 2010

(65) Prior Publication Data

US 2011/0218730 A1 Sep. 8, 2011

(51) Int. Cl.
- *H04B 7/00* (2006.01)
- *G01C 21/00* (2006.01)
- *G06F 17/00* (2006.01)
- *G06F 15/16* (2006.01)

(52) U.S. Cl.
CPC ............... *G01C 21/00* (2013.01); *G06F 17/00* (2013.01); *H04B 7/00* (2013.01); *G06F 15/16* (2013.01)

(58) Field of Classification Search
None
See application file for complete search history.

(56) References Cited

U.S. PATENT DOCUMENTS

| | | | | |
|---|---|---|---|---|
| 4,796,466 A * | 1/1989 | Farmer | 73/40.5 R |
| 5,018,061 A * | 5/1991 | Kishigami et al. | 711/3 |
| 5,046,353 A * | 9/1991 | Thompson | 73/40.7 |
| 5,416,724 A * | 5/1995 | Savic | 702/51 |
| 5,784,540 A * | 7/1998 | Faltings | 706/46 |
| 5,825,003 A * | 10/1998 | Jennings et al. | 235/379 |
| 5,883,815 A * | 3/1999 | Drakulich et al. | 702/51 |
| 6,008,808 A * | 12/1999 | Almeida et al. | 715/767 |
| 6,047,281 A * | 4/2000 | Wilson et al. | 1/1 |
| 6,177,860 B1 * | 1/2001 | Cromer et al. | 340/10.1 |
| 6,243,483 B1 * | 6/2001 | Petrou et al. | 382/103 |
| 6,359,434 B1 * | 3/2002 | Winslow et al. | 324/220 |
| 6,429,016 B1 * | 8/2002 | McNeil | 436/47 |
| 6,574,561 B2 * | 6/2003 | Alexander et al. | 702/5 |
| 6,683,614 B2 * | 1/2004 | Walls et al. | 345/506 |
| 6,738,628 B1 * | 5/2004 | McCall et al. | 455/456.1 |
| 6,920,618 B2 * | 7/2005 | Walls et al. | 715/840 |
| 7,027,046 B2 * | 4/2006 | Zhang | 345/419 |
| 7,027,924 B2 * | 4/2006 | Spoonhower et al. | 702/8 |
| 7,161,489 B2 * | 1/2007 | Sullivan et al. | 340/572.4 |
| 7,180,422 B2 * | 2/2007 | Milenkovic et al. | 340/572.4 |
| 7,242,303 B2 * | 7/2007 | Patel et al. | 340/572.4 |
| 7,251,236 B1 * | 7/2007 | Cook | 370/338 |
| 7,359,931 B2 * | 4/2008 | Tarabzouni et al. | 709/200 |
| 7,389,181 B2 * | 6/2008 | Meadow et al. | 701/522 |

(Continued)

FOREIGN PATENT DOCUMENTS

CA 2583222 A1 * 10/2006

*Primary Examiner* — John R Olszewski
*Assistant Examiner* — Jean-Paul Cass (57) ABSTRACT

One embodiment of the present invention is a method for managing a datacenter using a mobile device, which method includes: (a) in response to a user request, the mobile device causing an identification prober to obtain information from one or more of a plurality of identification providers disposed at predetermined locations in the datacenter, and determining a mobile device location in the datacenter therefrom; (b) the mobile device requesting a datacenter map from a datacenter management system, displaying at least a portion of the map on a mobile device display, and displaying the mobile device location on the at least a portion of the map; and (c) the mobile device obtaining an equipment location of an equipment in the datacenter from the datacenter management system, displaying directions from the mobile device location to the equipment location, and displaying the equipment location on the at least a portion of the map if it fits in the display.

30 Claims, 2 Drawing Sheets

(56) References Cited

U.S. PATENT DOCUMENTS

| | | | |
|---|---|---|---|
| 7,400,251 B2* | 7/2008 | Czyszczewski et al. | 340/572.1 |
| 7,418,491 B2* | 8/2008 | Childress et al. | 709/223 |
| 7,420,467 B2* | 9/2008 | Patenaude et al. | 340/572.1 |
| 7,761,496 B2* | 7/2010 | Tarabzouni et al. | 709/200 |
| 8,014,308 B2* | 9/2011 | Gates et al. | 370/252 |
| 8,037,185 B2* | 10/2011 | Steinder et al. | 709/226 |
| 8,171,142 B2* | 5/2012 | Kolin et al. | 709/226 |
| 8,200,737 B2* | 6/2012 | Tarabzouni et al. | 709/200 |
| 8,359,361 B2* | 1/2013 | Thornton et al. | 709/206 |
| 8,769,078 B2* | 7/2014 | Pesme et al. | 709/224 |
| 2002/0042700 A1* | 4/2002 | Giles et al. | 703/6 |
| 2007/0226543 A1* | 9/2007 | Young et al. | 714/43 |
| 2008/0167825 A1* | 7/2008 | Tarabzouni et al. | 702/36 |
| 2009/0012882 A1* | 1/2009 | Sarangapani et al. | 705/28 |
| 2011/0276637 A1* | 11/2011 | Thornton et al. | 709/206 |
| 2014/0180571 A1* | 6/2014 | Kimchi et al. | 701/409 |

* cited by examiner

MANAGING A DATACENTER USING MOBILE DEVICES

TECHNICAL FIELD

One or more embodiments of the present invention relate to managing a datacenter using mobile devices.

BACKGROUND

Modern datacenters can take various forms. Some datacenters are permanent installations consisting of large floor plans having row after row of racks full of blade servers, some of which permanent installations are over a football field in length. Other datacenters are "truckable" datacenters that are built from equipment shipped in containers. In either case, a typical datacenter involves thousands of servers. For example, at a density of up to 128 blade servers per fully loaded rack, an average sized corporate conference room could hold about 3000 servers.

Today, datacenters include physical servers (also referred to herein as hosts) on which a multiplicity of virtual machines (VMs) are run to enable servers to provide desired information technology (IT) functionality. As is known, in such datacenters, a datacenter management system (DMS) is typically used to manage an executing environment in the datacenter so it can provide an appropriate level of service to an enterprise. As is also known, and among other things, datacenter management entails moving VMs from one physical host to another to balance loads, and to provide functionality such as (a) fault tolerance such as that provided by VMware vSphere™ 4 Fault Tolerance software distributed by VMware, Inc. of Palo Alto, Calif.; and (b) distributed resource scheduling such as that provided by VMware vSphere™ 4 Distributed Resource Scheduler (DRS) software distributed by VMware, Inc. of Palo Alto, Calif.

IT managers face substantial problems in managing datacenters. In particular, technicians often have a problem in locating themselves as well as specific hardware in a large datacenter. In addition, because even a smaller datacenter can be densely packed with equipment, locating specific hardware to perform audits, repairs and upgrades is problematic. Unfortunately, problems in locating specific hardware can lead to long delays. These problems may be further exacerbated when managing datacenter functionality involving datacenters in multiple geographic locations.

Current DMSs provide relatively low level hardware information about the health of hosts in a datacenter inventory. For example, a typical example of such a DMS shows fan status, motherboard temperature, CMOS battery condition, and various other useful sensor data. In fact, in some cases such a DMS may provide enough information for a technician to identify a host hardware health issue. However, such a DMS typically makes no mapping available between virtual inventory objects and their physical locations. As a result, such a DMS does not enable users to navigate and manage actual datacenter infrastructure in a hands-on fashion. To better understand the problem, assume that a technician had to fix a malfunctioning fan on a host. The technician would first need to locate a datacenter inventory manager to obtain the physical location of the host whose fan is malfunctioning. Then, the technician would need to ask a datacenter virtual infrastructure (VI) administrator to evacuate all VMs from the host (for example, by moving them to other hosts), and to put the host into a maintenance mode. Finally, the technician would search about the datacenter to locate the host by searching for the rack, chassis and slot in the chassis at which the host is located. Most often, one person alone cannot fix a problem like this in an end-to-end fashion today.

Another illustration of such problems may be seen from the following scenario. One common way to stage an operation in a datacenter is to have a "build room" nearby for assembly, testing, and other preparation before a server is taken into the datacenter. When a server malfunctions, a technician locates a replacement server, brings the replacement server to the build room, configures the replacement server hardware to match the hardware of the malfunctioning server, determines the version of virtualization software running on the malfunctioning machine, installs that version of virtualization software on the replacement server, and tests the replacement server for compatibility. When the technician is ready to switch out the malfunctioning server, the VI administrator logs into the DMS which runs, for example, VMware vSphere™ 4 software distributed by VMware, Inc. and has it: (a) evacuate the VMs from the malfunctioning server, (b) put the malfunctioning server into maintenance mode, and (c) power it down. The technician then goes into the datacenter, swaps the server hardware, powers up the replacement server, walks back to the build room, updates an external inventory management system, and finally alerts the VI administrator. The VI administrator logs back into the DMS, which, in turn, removes the malfunctioning server from the inventory, adds the replacement server to the inventory, and finishes configuring the replacement server.

Although laptop or desktop computers appear to be a good choice for use in managing datacenter infrastructure (for example, technicians could carry laptops in the datacenter), they are cumbersome at best, and require one to plug in external sensors such as a compass, a Global Positioning System (GPS), a camera, a barcode scanner, and other modern sensors. To overcome this problem, some have tried to use the same software products that are used on a laptop or a desktop computer on a mobile device. However, the form factor of a mobile device limits its usefulness since it is unrealistic to execute all the use cases covered by a desktop client on a mobile device.

SUMMARY

One or more embodiments of the present invention solve one or more of the above-identified problems by providing methods for managing a datacenter using mobile devices. In particular, one embodiment of the present invention is a method for managing a datacenter using a mobile device, which method comprises: (a) in response to a user request, the mobile device causing an identification prober to obtain information from one or more of a plurality of identification providers disposed at predetermined locations in the datacenter, and determining a mobile device location in the datacenter therefrom; (b) the mobile device requesting a datacenter map from a datacenter management system, displaying at least a portion of the map on a mobile device display, and displaying the mobile device location on the at least a portion of the map; and (c) the mobile device obtaining an equipment location of an equipment in the datacenter from the datacenter management system, displaying directions from the mobile device location to the equipment location, and displaying the equipment location on the at least a portion of the map if it fits in the display.

DETAILED DESCRIPTION

Figure 1:
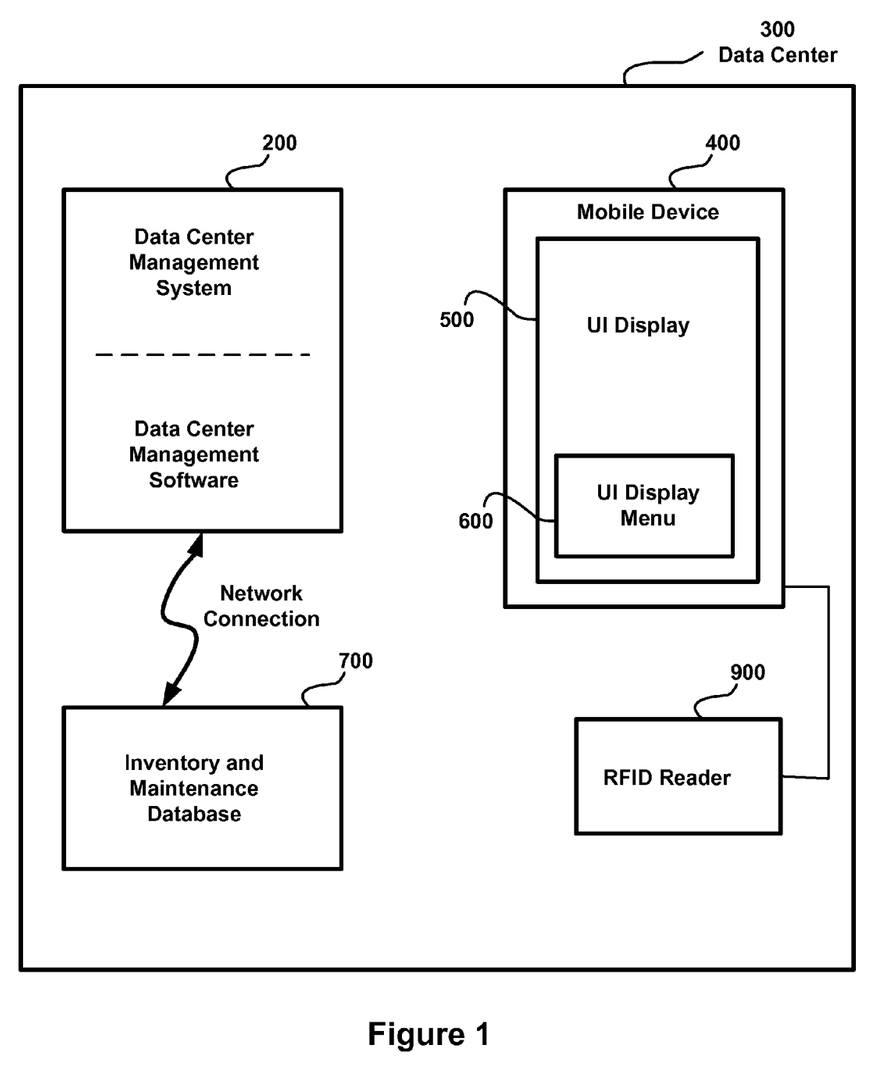
FIG. 1 is a block diagram of apparatus used to manage a datacenter in accordance with one or more embodiments of the present invention, which apparatus includes a mobile device.

As shown in FIG. 1, in accordance with one or more embodiments of the present invention, datacenter management system (DMS) 100 comprises, for example and without limitation, datacenter manager server 200 that is located within or without datacenter 300, and data center management software. As further shown in FIG. 1, DMS 100 interacts with mobile device 400, for example and without limitation, a personal digital assistant ("PDA") or a smart phone using, for example and without limitation, the mobile device's Wi-Fi connection or 3G connection.

RFID-Reader-Enabled and/or Barcode-Reader-Enabled Mobile Device

In accordance with one or more embodiments of the present invention, and as shown in FIG. 1, radio frequency identification (RFID) reader 900 is enabled to transmit information to and/or to receive information from mobile device 400. As is well known, an RFID reader includes a transmitter that outputs radio frequency (RF) signals through an antenna to create an electromagnetic field that enables RFID tags to return an RF signal carrying information stored in the tag, which RFID tag information is then received by the reader. Some types of conventional RFID tags are "passive" tags, i.e., tags without an internal power source that may be energized by the RF signals output by the RFID reader, and "active" tags, i.e., tags with an internal power source. In accordance with one or more embodiments of the present invention, the RFID tag information may include the configuration of an item to which it is affixed, and the configuration of the item may include information related to specifications of the item. For example, with respect to an item comprised of a computer system (for example and without limitation, a server), the hardware and software configuration of the computer system may be stored in an RFID tag attached to the computer system. Other information may also be stored in the tag, such as a list of major components, supplier information, a spare parts list, and other information about the item. The configuration and other information for the item may be stored prior to a first time the item is delivered to inventory. For example, the manufacturer may store this information in the RFID tag for the item. In addition, the RFID tag information may be encrypted/decrypted by an application providing or utilizing the information, respectively, i.e., whether in DMS 100 or mobile device 400. The RFID tag may have a write-once memory or may have a re-writable memory, such as a flash memory. Also, the RFID tag may be provided on the inside of a housing of the item or on another location on the item that is not readily accessible.

In accordance with one or more embodiments of the present invention, RFID reader 900 may transmit information to and/or receive information from mobile device 400 using, for example and without limitation, a Universal Serial Bus (USB) connection or a Bluetooth connection. In accordance with one or more further such embodiments of the present invention, RFID reader 900 may also transmit information to and/or receive information from datacenter manager server 200 by, for example and without limitation, a wireless connection. In accordance with one or more embodiments of the present invention, RFID tag information may be stored by mobile device 400 or DMS 100 (notwithstanding whether: (a) the RFID tag information was sent directly to DMS 100 by the RFID tag or (b) the RFID tag information was retrieved from the RFID tag by RFID reader 900 and transferred to mobile device 400 and then to DMS 100). Also, in accordance with one or more further such embodiments of the present invention, an RFID tag may be independently powered from the item with which it is associated, and the RFID tag may transmit information in response to input received from DMS 100, for example and without limitation, by transmitting and receiving information and commands over a Bluetooth connection or a Wi-Fi connection to an associated appliance. In accordance with one or more embodiments of the present invention, when mobile device 400 interacts with RFID reader 900 in the manner described above, mobile device 400 will be referred to herein as an RFID-Reader-Enabled mobile device.

As is well known, a mobile device such as a smartphone can scan barcodes (1-dimensional barcodes or 2-dimensional barcodes) using a camera contained therein. In addition, widely available software enables the mobile device to read and interpret the barcodes from camera images. In accordance with one or more embodiments of the present invention, when mobile device 400 is enabled to read and interpret barcodes, mobile device 400 it will be referred to herein as a Barcode-Reader-Enabled mobile device.

As used herein, an RFID tag or a barcode (sometimes referred to as a barcode label) may also be referred to herein as an identification provider. In addition, as used herein an RFID reader or a barcode reader may also be referred to herein as an identification prober.

Equipment Installation

In accordance with one or more embodiments of the present invention, a map, an overall floor plan, and the location of every rack, chassis, and blade (i.e., each trackable item in datacenter 300) is available to DMS 100 using inventory and maintenance database 700.

In accordance with one or more such embodiments, the location of an item could be determined: (a) at installation by a datacenter designer and stored in inventory and maintenance database 700; or (b) after installation by an audit and stored in inventory and maintenance database 700.

In accordance with one or more further embodiments of the present invention, RFID tags are affixed to each trackable item, and when a trackable item is installed in datacenter 300, a technician selects a selectable entry on UI display menu 600 of UI display 500 of mobile device 400. In response: (a) RFID-Reader-Enabled mobile device 400 causes RFID reader 900 to scan the RFID tag, (b) mobile device 400 determines the item ID from the RFID tag information, (c) mobile device 400 determines a location of the RFID tag in the manner described below, and (d) mobile device 400 transfers the location to DMS 100. In response, DMS 100 updates inventory and maintenance database 700. If the original location of the item has changed from that stored in inventory and maintenance database 700 or if there is no entry in inventory and maintenance database 700, DMS 100 sends a request for mobile device 400 to have RFID reader 900 write the new location information into the RFID tag.

In accordance with one or more further embodiments of the present invention, barcodes are affixed to each trackable item, and when a trackable item is installed in the datacenter, a technician selects a selectable entry on UI display menu 600 of UI display 500 of mobile device 400. In response: (a) mobile device 400 takes a picture of the barcode, (b) mobile device 400 determines the item ID from the photograph, (c) mobile device 400 determines a location of the barcode tag in the manner described below, and (d) mobile device 400 transfers the location to DMS 100. In response, DMS 100 updates inventory and maintenance database 700.

In accordance with one or more further embodiments of the present invention, RFID tags are affixed to some trackable items and barcodes are affixed to other trackable items, and some trackable items have an RFID tag and a barcode (for example and without limitation, a separate RFID tag and barcode or a single label with a printed barcode on the outside and an RFID tag on the inside).

In accordance with one or more further embodiments of the present invention, when a trackable item is installed in the datacenter, a technician selects a selectable entry on UI display menu 600 of UI display 500 of mobile device 400 which causes: (a) mobile device 400 to take a photograph of the installation location, and (b) mobile device 400 to transfer the photograph to DMS 100. In response, DMS 100 updates inventory and maintenance database 700.

In accordance with one or more embodiments of the present invention, DMS 100 may run one or more applications such as, for example and without limitation, applications for tracking maintenance information for items, and for creating service records.

Mobile Device UI Display

In accordance with one or more such embodiments of the present invention, DMS 100 interacts with mobile device 400 to present a user interface (UI) which includes a display (referred to herein as UI display 500). In accordance with one or more such embodiments of the present invention, DMS 100 causes UI display 500 to present various actions which may be selected by a user, which actions may be displayed, for example and without limitation, in a drop-down menu in accordance with one or more methods that are well known to those of ordinary skill in the art. In accordance with one or more embodiments of the present invention, actions are presented that relate to a single function, or actions are presented that relate to a series of functions that are carried out in accordance with a script, which script can be pre-configured in accordance with any one of a number of methods that are well known to those of ordinary skill in the art using an appropriate software application that runs in mobile device 400, which script can be configured by a technician using UI display 500 in accordance with any one of a number of methods that are well known to those of ordinary skill in the art, or which script can be pre-configured in accordance with any one of a number of methods that are well known to those of ordinary skill in the art using an appropriate software application that runs in DMS 100, which script can be transmitted from DMS 100 to mobile device 400. In addition, and in accordance with one or more such embodiments, UI display menu 600 includes a menu of selectable actions where selection may be carried out using "clickable buttons" (for example and without limitation, actual buttons or software created display buttons on a touch screen) in accordance with any one of a number of methods that are well known to those of ordinary skill in the art.

In accordance with one or more embodiments of the present invention, providing information to be displayed on UI display 500 of mobile device 400 may be accomplished: (a) by DMS 100 obtaining the information, for example and without limitation, from inventory and maintenance database 700, and transmitting the information to mobile device 400 in an appropriate format for presentation; (b) by DMS 100 obtaining the information, for example and without limitation, from inventory and maintenance database 700, and transmitting the information to mobile device 400 and mobile device 400 running a display application that appropriately formats and presents the information; (c) by mobile device 400 obtaining the information, for example and without limitation, from inventory and maintenance database 700 and appropriately formatting and presenting it; or (d) a combination of the foregoing, wherein obtaining, formatting and presenting the information may be done in accordance with any one of a number of methods that are well known to those of ordinary skill in the art. It should also be understood that providing the display may also be accomplished: (a) by DMS 100 obtaining the display menu information, for example and without limitation, from inventory and maintenance database 700, and transmitting the display menu information to mobile device 400 in an appropriate format for presentation; (b) by DMS 100 obtaining the display menu information, for example and without limitation, from inventory and maintenance database 700, and transmitting the display menu information to mobile device 400 and mobile device 400 running a display application that appropriately formats and presents the information; (c) by mobile device 400 obtaining the display menu information, for example and without limitation, from a database and appropriately formatting and presenting it; or (d) a combination of the foregoing, wherein obtaining, formatting and presenting the information may be done in accordance with any one of a number of methods that are well known to those of ordinary skill in the art. As one of ordinary skill in that art will readily appreciate, inventory and maintenance database 700 may be one or more databases that are specific to a particular datacenter or may be one or more databases that are enterprise databases or some combination of the foregoing.

It should also be understood that receiving user input from mobile device 400 may be accomplished by mobile device 400 receiving user input in accordance with any one of a number of method that are well known to those of ordinary skill in the art such as, for example and without limitation, and transmitting the user input to DMS 100 or to an application running on mobile device 400 for response in accordance with one or more embodiments of the present invention. In accordance with one or more such embodiments, when a user inputs information or selects a menu entry, the user input may be transmitted to DMS 100 to take an appropriate action, or an application running on mobile device 400 may take the appropriate action.

UI Display Actions

Scan: In accordance with one or more embodiments, UI display menu 600 includes a selectable entry which, when selected, causes the RFID-Reader-Enabled and/or Barcode-Reader-Enabled mobile device to scan an RFID tag and/or a barcode.

Access Item: In accordance with one or more embodiments of the present invention, UI display menu 600 includes a selectable entry for accessing information relating to an item of equipment in datacenter 300 such as, for example and without limitation, a server using, for example and without limitation, a serial number of the item or a "trouble ticket identifier (TTID)" associated with the item, where a TTID is an identifier generated by DMS 100 when a problem that needs a technician's assistance is input to DMS 100 or stored, for example and without limitation, in inventory and maintenance database 700 used to administer datacenter maintenance. In addition, and in accordance with one or more such embodiments, UI display menu 600 includes a selectable entry which, when selected, presents a map of datacenter 300, which map may include the technician's location and the map may include the location of a rack that contains the item. However, as one of ordinary skill in the art can readily appreciate, due to the form factor of a typical mobile device, both of these locations may not fit on the map at the same time, and the following describes how the technician may navigate between the location of the technician and the location of the item in accordance with one or more embodiments of the present invention.

Method and Apparatus to Determine Technician Location

In accordance with one or more embodiments of the present invention, UI display menu 600 presents a selectable entry for determining the technician's location (for example and without limitation, "Find Location"). In response to selecting the entry, the following occurs. In accordance with one or more embodiments of the present invention, the location of mobile device 400 may be obtained by Wi-Fi triangulation using any one of a number of methods that are well known to those of ordinary skill in the art. In accordance with one or more such embodiments, datacenter 300 includes a number of Wi-Fi base stations, and the location of mobile device 400 may be determined by utilizing the signal strength and ping time from Wi-Fi base stations whose locations are known. In accordance with one or more embodiments of the present invention, software to carry out the triangulation may be resident in mobile device 400. In such a case, the locations of the Wi-Fi base stations may be transmitted to mobile device 400 from DMS 100. In accordance with one or more further embodiments, software to carry out the triangulation may be resident in DMS 100 or in datacenter manager server 200. In any case, once the location of mobile device 400 is determined, an appropriate portion of the datacenter map can be transmitted from DMS 100 to mobile device 400, and mobile device 400 can display the map with an indication of the location of mobile device 400 (and hence, the location of the user).

In accordance with one or more embodiments of the present invention, the location of mobile device 400 may be obtained using an RFID triangulation procedure in accordance with any one of a number of methods that are well known to those of ordinary skill in the art. In accordance with one or more such embodiments, datacenter 300 includes a number of RFID tags whose RFID tag information includes location and a unique ID (which location was input when the RFID tag was installed in datacenter 300). The location could be predetermined by a datacenter manager or designer, and the RFID tag could be installed at the predetermined location, or the location could be determined at installation and the RFID tag information could be updated at installation. The triangulation procedure could use RF signals transmitted to RFID reader 900 from RFID tags affixed to racks in response to signals transmitted thereto from RFID reader 900, or the triangulation procedure could use RFID signals transmitted from RFID tags in response to commands send to the RFID tags from DMS 100. In accordance with one or more embodiments of the present invention, software to carry out the triangulation procedure may be resident in mobile device 400. In such a case, the locations of the RFID tags base stations may be transmitted to mobile device 400 from DMS 100. In accordance with one or more further embodiments, software to carry out the triangulation may be included within DMS 100 or may co-exist with DMS 100 in datacenter manager server 200. In accordance with one or more such embodiments, the technician's location could also be detected by detecting which RFID tags come into range and which disappear as the technician moves through datacenter 300. In any case, once the location of mobile device 400 is determined, an appropriate portion of the datacenter map can be transmitted from DMS 100 to mobile device 400, and mobile device 400 can display the map with an indication of the location of mobile device 400 (and hence, the location of the user). Note that for embodiments utilizing active RFID tags, the active RFID tags need to be used with racks designed to enable the RFID tags to be placed so they are not completely enclosed and thereby rendered unreadable. It should also be understood that triangulation using RFID tags could also include RFID tags associated with equipment: (a) where a tag id would be transmitted from mobile device 400 to DMS 100 and, in turn, DMS 100 would transmit a location of such tags back to mobile device 400; or (b) where the tag's location would be included in the tag information.

In accordance with one or more embodiments of the present invention, the location of mobile device 400 may be obtained using a barcode identification procedure. In accordance with one or more such embodiments, datacenter 300 includes a number of barcodes affixed to racks where the locations of such barcodes are known to, or obtainable from, inventory and maintenance database 700 by, DMS 100. The locations could be predetermined by a datacenter manager or designer, and the barcodes could be affixed at the predetermined locations. In accordance with one or more embodiments of the present invention, in such a case, the technician scans the barcode and the location of mobile device 400 (and hence the location of the technician) is taken to be the location of the scanned barcode. Once the location of mobile device 400 is determined, an appropriate portion of the datacenter map can be transmitted from DMS 100 to mobile device 400, and mobile device 400 can display the map with an indication of the location of mobile device 400 (and hence, the location of the technician). It should also be understood that triangulation using barcodes could also include barcodes associated with equipment: (a) where a barcode id would be transmitted from mobile device 400 to DMS 100 and, in turn, DMS 100 would transmit a location of such barcodes back to mobile device 400; or (b) where the barcode's location would be included in the barcode information.

In accordance with one or more embodiments of the present invention, the location of mobile device 400 may be obtained using an RFID tag identification procedure. In accordance with one or more such embodiments, datacenter 300 includes a number of RFID tags affixed to racks where the locations of such RFID tags are known to, or obtainable from, inventory and maintenance database 700 by, DMS 100. The locations could be predetermined by a datacenter manager or designer, and the RFID tags could be affixed at the predetermined locations. In accordance with one or more embodiments of the present invention, in such a case, the technician scans the RFID tag and the location of mobile device 400 is taken to be the location of the scanned RFID tag. Once the location of mobile device 400 is determined, an appropriate portion of the datacenter map can be transmitted from DMS 100 to mobile device 400, and mobile device 400 can display the map with an indication of the location of mobile device 400 (and hence, the location of the technician).

In accordance with one or more embodiments of the present invention, the location of mobile device 400 may be obtained using global positioning system (GPS) signals. In accordance with one or more such embodiments, datacenter 300 includes a number of GPS signal repeaters that enable mobile device 400 to utilize GPS software to determine its location. In accordance with one or more embodiments of the present invention, the GPS software may be resident in mobile device 400, and in accordance with one or more further embodiments, the GPS software may be included in DMS 100 or may co-exist with DMS 100 in datacenter manager server 200. In any case, once the location of mobile device 400 is determined, an appropriate portion of the datacenter map can be transmitted from DMS 100 to mobile device 400, and mobile device 400 can display the map with an indication of the location of mobile device 400 (and hence, the location of the technician).

In accordance with one or more embodiments of the present invention, the location of mobile device 400 may be obtained using a triangulation procedure in accordance with any one of a number of methods that are well known to those of ordinary skill in the art based on Bluetooth signals. In accordance with one or more such embodiments, datacenter 300 includes a number of Bluetooth connectors in datacenter 300 (for example, and without limitation: (a) a Bluetooth dongle may be plugged into each server; (b) a Bluetooth dongle may be plugged into predetermined servers which act as "tracers," for example, one server per rack; (c) a Bluetooth connector may be built directly into a motherboard; or (d) a Bluetooth connector may be attached via a server port), where the datacenter Bluetooth connector contains information including location and a unique ID (which location was input when the datacenter Bluetooth connector was installed in datacenter 300). The location could be predetermined by a datacenter manager or designer, and the datacenter Bluetooth connector could be installed at the predetermined location, or the location could be determined at installation and the datacenter Bluetooth connector information could be updated at installation. The triangulation procedure could use Bluetooth signals transmitted to a Bluetooth connector of mobile device 400 from datacenter Bluetooth connectors associated with servers in response to signals transmitted thereto from mobile device 400, or the triangulation procedure could use Bluetooth signals transmitted from datacenter Bluetooth connector in response to commands sent to the datacenter Bluetooth connectors by the servers in response to commands from DMS 100. In accordance with one or more embodiments of the present invention, software to carry out the triangulation procedure may be resident in mobile device 400. In such a case, the locations of the datacenter Bluetooth connectors may be transmitted to mobile device 400 from DMS 100. In accordance with one or more further embodiments, software to carry out the triangulation may be included within DMS 100 or may co-exist with DMS 100 in datacenter manager server 200. In accordance with one or more further embodiments, the technician's location could also be detected by detecting which datacenter Bluetooth connectors come into range and which disappear as the technician moves through datacenter 300. In addition, and in accordance with one or more further embodiments, the location of mobile device 400 may be determined by utilizing the signal strength and ping time from datacenter Bluetooth connectors whose locations are known. In accordance with one or more embodiments of the present invention, software to carry out the triangulation may be resident in mobile device 400. In such a case, the locations of the datacenter Bluetooth connectors may be transmitted to mobile device 400 from DMS 100. In accordance with one or more further embodiments, software to carry out the triangulation may be resident in DMS 100 or in datacenter manager server 200. In any case, once the location of mobile device 400 is determined, an appropriate portion of the datacenter map can be transmitted from DMS 100 to mobile device 400, and mobile device 400 can display the map with an indication of the location of mobile device 400 (and hence, the location of the user).

In accordance with one or more embodiments of the present invention, the location of mobile device 400 may be obtained using a Bluetooth connector identification procedure. In accordance with one or more such embodiments, datacenter 300 includes a number of datacenter Bluetooth connectors affixed to racks where the locations of such datacenter Bluetooth connectors are known to, or obtainable from, inventory and maintenance database 700 by, DMS 100. The locations could be predetermined by a datacenter manager or designer, and the datacenter Bluetooth connectors could be affixed at the predetermined locations. In accordance with one or more embodiments of the present invention, in such a case, the technician uses a Blue-tooth enabled mobile device to connect with the datacenter Bluetooth connector, and the location of mobile device 400 is taken to be the location of the connected datacenter Bluetooth connector. Once the location of mobile device 400 is determined, an appropriate portion of the datacenter map can be transmitted from DMS 100 to mobile device 400, and mobile device 400 can display the map with an indication of the location of mobile device 400 (and hence, the location of the technician).

In accordance with one or more embodiments of the present invention, a combination of the above methods and apparatus for determining location can be utilized, for example and without limitation, where a mixture of barcodes and/or RFID tags and/or Bluetooth connectors is deployed.

In accordance with one or more embodiments of the present invention, as the technician moves, the technician's location is updated periodically utilizing one or more of the above-described methods, and the map and the technician's location thereon are also updated. In accordance with one or more such embodiments, the period of the updates may be a configurable parameter. In addition, and in accordance with one or more further embodiments of the present invention, the updates are performed continuously until turned off by the technician requesting it and/or in response to the technician requesting another function requiring use of the display.

Method and Apparatus to Determine Direction from One Location to Another

In accordance with one or more embodiments, UI display menu 600 presents a selectable entry for receiving directions for traveling from the technician's location to the location of an item in datacenter 300, which item has been identified by, for example and without limitation, serial number. In response to selecting the entry, the following occurs. In accordance with one or more such embodiments of the present invention, DMS 100 retrieves the location of the item from inventory and maintenance database 700, compares it with the location of the technician, and determines directions to the location of the item in accordance with any one of a number of methods that are well known to those of ordinary skill in the art. DMS 100 then transmits the directions along with the location of the item to mobile device 400 to present on UI display 500. When mobile device determines that the location of the item can fit on the map along with the location of the technician, both are presented thereon.

Method and Apparatus to Identify an Item

In accordance with one or more embodiments of the present invention, when the location of the technician and the location of the item are within a predetermined distance from each other, UI display menu 600 presents a selectable entry for requesting a photograph of the location of the item. In response to selecting the entry, mobile device 400 requests the photograph from DMS 100. DMS 100 obtains the photograph, if it exists, from inventory and maintenance database 700, and forwards it to mobile device 400. Mobile device 400 displays the photograph for the technician's view on UI display 500. In accordance with one or more such embodiments, UI display menu 600 presents a selectable entry for requesting information relating to the physical layout of an item. In response, the following occurs. Mobile device 400 causes RFID reader 900 to scan an RFID tag affixed to the item, or mobile device 400 causes a photograph to be taken of a barcode affixed to the item. Then, mobile device 400 determines the item ID from either the RFID tag information or barcode information and transmits the item ID to DMS 100. Alternatively, mobile device 400 transmits the RFID tag information or the barcode information to DMS 100 which determines the item ID. DMS 100 retrieves a photograph of the item, if it exists, for example and without limitation, in inventory and maintenance database 700, and forwards it to mobile device 400 for presentation on UI display 500. In addition, in accordance with one or more further embodiments, DMS 100 may also retrieve: (a) a configuration map; (b) information relating to the physical layout of NICs and details relating to a physical cable configuration; and (c) information from help manuals, based on the server in question and the current status of the equipment/datacenter.

In accordance with one or more further such embodiments, UI display menu 600 presents a selectable entry for requesting a server to identify itself by providing a visual output, for example and without limitation, by flashing its network interface cards (NICs), or by providing an auditory output, for example and without limitation, by sounding its PC speaker. In response to selecting the entry, mobile device 400 transmits the request to DMS 100 which relays the request to the server. If the technician selects a port group, NICs on that port group can be requested to flash their lights.

In accordance with one or more further embodiments of the present invention, if there was a problem, the technician could select a selectable entry on UI display menu 600 which, when selected, causes mobile device 400 to request DMS 100 to collect logs and forward or email the logs, for example and without limitation, to a helpdesk for troubleshooting in accordance with any one of a number of methods well known to those of ordinary skill in the art.

Method for Managing a Datacenter

Figure 2:
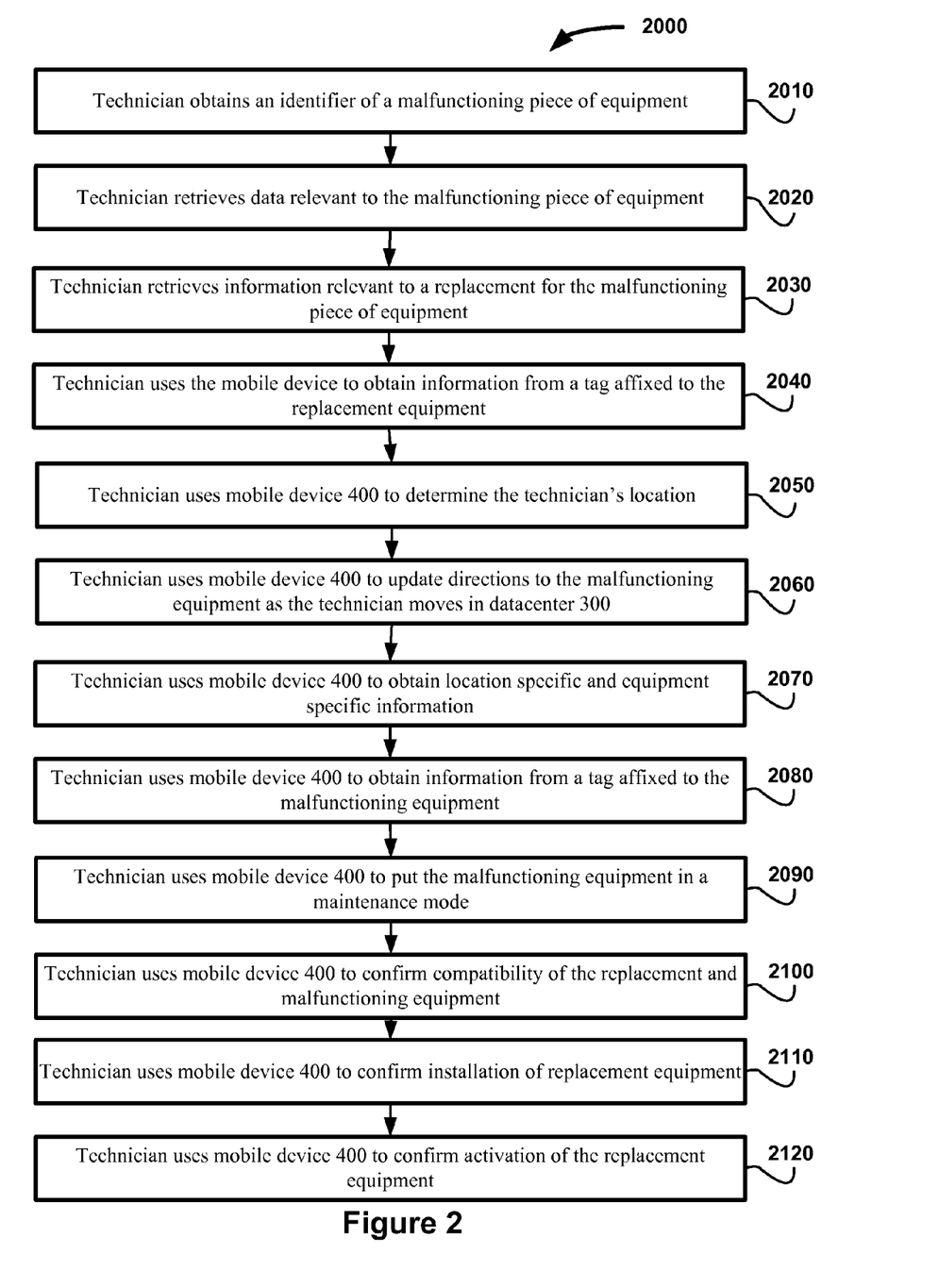
FIG. 2 is a block diagram illustrating a method for managing a datacenter using a mobile device, which method operates in accordance with one or more embodiments of the present invention.

FIG. 2 is a block diagram illustrating method 2000 for managing a datacenter using a mobile device in accordance with one or more embodiments of the present invention. Consider the scenario described in the "Background" where a technician needs to replace a piece of equipment, for example and without limitation, a server in datacenter 300.

As indicated in FIG. 2, at step 2010 of method 2000, a technician obtains an identifier of a malfunctioning piece of equipment. In accordance with one or more embodiments of the present invention, DMS 100 accesses inventory and maintenance database 700, retrieves a serial number of a malfunctioning piece of equipment (for example and without limitation, a server) or a trouble ticket ID relating to the malfunctioning piece of equipment, and sends the information to mobile device 400 for presentation on UI display 500 associated with a particular technician or sends the information to an e-mail account associated with the particular technician. In accordance with one or more alternative embodiments of the present invention, the technician selects a selectable entry on UI display menu 600 that retrieves and displays a list of "troubles" that need to be resolved. In response, mobile device 400 requests the list from DMS 100, and DMS 100, in turn, obtains the list from inventory and maintenance database 700, and transmits it to mobile device 400 for presentation to the technician on UI display 500.

As indicated in FIG. 2, at step 2020 of method 2000, the technician retrieves data relevant to the malfunctioning piece of equipment. In accordance with one or more further embodiments of the present invention, the technician selects a selectable entry on UI display menu 600 that retrieves data relevant to the malfunctioning server, which malfunctioning server is identified by, for example and without limitation, its serial number or a trouble ticket ID associated with the malfunctioning server. In response, mobile device 400 requests the data from DMS 100, and DMS 100, in turn, obtains the data from inventory and maintenance database 700, and transmits it to mobile device 400 for presentation to the technician on UI display 500.

As indicated in FIG. 2, at step 2030 of method 2000, the technician retrieves information relevant to a replacement for the malfunctioning piece of equipment. In accordance with one or more further embodiments of the present invention, the technician selects a selectable entry on UI display menu 600 that indicates a readiness to replace the malfunctioning server. In response, mobile device 400 sends the indication of readiness to DMS 100, and DMS 100, in turn, accesses inventory and maintenance database 700 to obtain a list of potential replacement equipment that is suitable to replace the malfunctioning server and which is accessible to the technician by, for example and without limitation, being located in a storeroom in datacenter 300. DMS 100 transmits the list to mobile device 400 for presentation to the technician on UI display 500. Alternatively, DMS 100 sends a request to a storage depot to have appropriate replacement equipment transferred to datacenter 300. In such a case, the technician may obtain a suitable replacement for the malfunctioning server before venturing into the datacenter.

As indicated in FIG. 2, at step 2040 of method 2000, the technician uses mobile device 400 to obtain information from a tag affixed to the replacement equipment. When the technician obtains a potential replacement equipment, the technician selects a selectable entry on UI display menu 600 that causes mobile device 400 to obtain information concerning the potential replacement equipment. In particular, mobile device 400 sends a signal to RFID reader 900 or the barcode reader (i.e., a camera associated with mobile device 400), respectively, of RFID-Reader-Enabled and/or Barcode-Reader-Enabled mobile device 400, respectively, to scan an RFID tag or read a barcode, respectively, that is affixed to the potential replacement server to obtain its unique serial number and hardware details.

As indicated in FIG. 2, at step 2050 of method 2000, the technician uses mobile device 400 to determine the technician's location in datacenter 300. In accordance with one or more embodiments of the present invention, when the technician is ready to find the malfunctioning equipment, the technician selects a selectable entry on UI display menu 600 entitled, for example and without limitation, "Find My Physical Location." In response, UI display 500 presents a map of datacenter 300 on UI display 500 that shows: (a) the technician's location (in the manner described above); (b) an indication of the location of a rack that contains the malfunctioning server if the technician's location and the equipment's location can fit on the map at the magnification desired by the technician, which equipment's location is stored in inventory and maintenance database 700; and (c) optionally, directions for travelling from the technician's location to the location of the rack (in the manner described above).

As indicated in FIG. 2, at step 2060 of method 2000, the technician uses mobile device 400 to update directions to the malfunctioning equipment as the technician moves in datacenter 300. In accordance with one or more embodiments of the present invention, as the technician moves through datacenter 300, the map presented on UI display 500 of mobile device 400 continues to update the technician's location (in the manner described above), and UI display 500 continues to update the directions to the malfunctioning server (in the manner described above).

As indicated in FIG. 2, at step 2070 of method 2000, the technician uses mobile device 400 to obtain location specific and equipment specific information. When the technician gets to the designated rack, the technician selects a selectable entry on UI display 600 that retrieves rack data, optionally retrieves a photographic image of the rack, and optionally causes the malfunctioning equipment to provide some physical manifestation that indicates its identity (in the manner described above). In response, mobile device 400 request data from DMS 100, and optionally requests DMS 100 to cause the physical manifestations to occur. DMS 100, in turn, obtains the data and photograph from inventory and maintenance database 700, and transmits it to mobile device 400 for presentation to the technician on UI display 500. In addition, if requested, DMS 100 sends a command to the server to cause it to provide the physical manifestations.

As indicated in FIG. 2, at step 2080 of method 2000, the technician uses mobile device 400 to obtain information from a tag affixed to the malfunctioning equipment. In accordance with one or more embodiments, when the technician believes s/he is at the correct rack, the technician selects a selectable entry on UI display 600 that causes mobile device 400 to obtain information concerning the malfunctioning server. In particular, mobile device 400 sends a signal to RFID reader 900 or the barcode reader (i.e., a camera associated with mobile device 400), respectively, of RFID-Reader-Enabled and/or Barcode-Reader-Enabled mobile device 400, respectively, to scan an RFID tag or read a barcode, respectively, that is affixed to the malfunctioning server to obtain its unique serial number and hardware details. In accordance with one or more such embodiments, this information enables DMS 100 to confirm that the technician is at the correct location and accessing the correct piece of equipment.

As indicated in FIG. 2, at step 2090 of method 2000, the technician uses mobile device 400 to put the malfunctioning equipment in a "maintenance mode." In accordance with one or more embodiments of the present invention, the technician selects a selectable entry on UI display 600 entitled, for example and without limitation, "Enter Maintenance Mode." Mobile device 400 forwards the request to DMS 100, and, in response, DMS 100 evacuates all virtual machines (VMs) running on the server to another server in accordance with any one of a number of methods that are well known to those of ordinary skill in the art, and places the malfunctioning server in "maintenance mode."

As indicated in FIG. 2, at step 2100, the technician uses mobile device 400 to confirm compatibility of the replacement and malfunctioning equipment. Next, in accordance with one or more embodiments of the present invention, DMS 100 creates a profile of the malfunctioning server's configuration (the profile includes, for example and without limitation, the number and type of CPUs, all network and storage configurations, and the version of virtualization software running on the malfunctioning server), and transmits the profile information to mobile device 400 for presentation to the technician on UI display 500. In accordance with one or more embodiments of the invention, the technician uses the profile to obtain a replacement server or, optionally, the malfunctioning server's profile was obtained prior to the technician's entering datacenter 300 (as was described above), and the malfunctioning server's profile was used to obtain the replacement server at that time. In accordance with one or more embodiments of the present invention, if this has not been done previously, the technician selects a selectable entry on UI display 600 that causes mobile device 400 to obtain a profile of the potential replacement server. In particular, mobile device 400 sends a signal to RFID reader 900 or the barcode reader (i.e., a camera associated with mobile device 400), respectively, of RFID-Reader-Enabled and/or Barcode-Reader-Enabled mobile device 400, respectively, to scan an RFID tag or read a barcode, respectively, that is affixed to the potential replacement server to obtain its unique serial number and hardware details. Mobile device 400 transmits the information to DMS 100, and in response, DMS 100 determines whether the potential replacement server is compatible with the malfunctioning server (for example and without limitation, DMS 100 determines whether the CPU, network and storage configurations are suitable so that the replacement server can perform the tasks previously performed by the malfunctioning server). Alternatively, mobile device 400 carries out the compatibility determination. If the replacement server is compatible with the malfunctioning server, UI display 500 indicates that the replacement can be made. In response, the technician places the replacement server in a rack position designated therefor by DMS 100.

As indicated in FIG. 2, at step 2110 of method 2000, the technician uses mobile device 400 to confirm installation of replacement equipment. In accordance with one or more embodiments of the present invention, the technician selects a selectable entry on UI display 600 entitled, for example and without limitation, "Install New Hardware?" Mobile device 400 forwards the request to DMS 100, and in response, DMS 100 powers on the replacement server, places the replacement server in an appropriate server cluster in the datacenter (i.e., a software assignment relating to datacenter virtualization management that is well known to those of ordinary skill in the art), and reconfigures the replacement server to meet the server cluster's requirements, including, for example and without limitation, installing the correct version of virtualization software for the replacement server.

As indicated in FIG. 2, at step 2120 of method 2000, the technician uses mobile device 400 to confirm activation of the replacement equipment. Next, in accordance with one or more embodiments of the present invention, the technician selects a selectable entry on UI display 600 entitled, for example and without limitation, "Activate New Hardware?" Mobile device 400 forwards the request to DMS 100, and in response, DMS 100 powers off the malfunctioning server, puts the replacement server to work by taking up the duties of the malfunctioning server in accordance with methods that are well known to those of ordinary skill in the art, and transmits that status to mobile device 400 for presentation to the technician on UI display 500 that the task has been completed. In response, the technician removes the malfunctioning server.

As one of ordinary skill in the art will readily appreciate, in accordance with one or more embodiments of the present invention, one or more of the above-described steps of method 2000 may be optional.

It should be appreciated that further embodiments of the present invention exist wherein mobile device 400 includes a Bluetooth connector (which mobile device may be referred to as a Bluetooth-Enabled mobile device) and wherein datacenter Bluetooth connectors are connected to various items of equipment. As such, as used herein the term identification provider includes a datacenter Bluetooth connector and the term identification prober includes a mobile device associated Bluetooth connector. In addition, in accordance with one or more such embodiments, the methods described above with involve use of an RFID-Reader-Enabled mobile device and/or Barcode-Reader-Enabled mobile device also may include the use of a Bluetooth-Enabled mobile device.

One or more embodiments of the present invention, including embodiments described herein, may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments of the present invention, including embodiments described herein, may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Many changes and modifications may be made to the description set forth above by those of ordinary skill in the art while remaining within the scope of the invention. In addition, apparatus, methods and mechanisms suitable for fabricating one or more embodiments of the present invention have been described above by providing specific, non-limiting examples and/or by relying on the knowledge of one of ordinary skill in the art. Apparatus, methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described apparatus, methods and mechanisms.

As such, the scope of the invention should be determined with reference to the appended claims along with their full scope of equivalents. Accordingly, the described embodiments are to be considered as exemplary and illustrative and not restrictive, and the scope of the claims is not to be limited to details given herein, but may be modified within the scope and equivalents of the claims. The claim elements and/or steps do not imply any particular order of operation, unless explicitly stated in the claims.

Many changes and modifications may be made to the description set forth above by those of ordinary skill in the art while remaining within the scope of the invention. In addition, materials, methods, and mechanisms suitable for fabricating embodiments of the present invention have been described above by providing specific, non-limiting examples and/or by relying on the knowledge of one of ordinary skill in the art. Materials, methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing a datacenter using a mobile device, which method comprises:
    in response to a user request, the mobile device causing an identification prober to obtain information from one or more of a plurality of identification providers disposed at predetermined locations in the datacenter, and determining a mobile device location in the datacenter therefrom;
    the mobile device requesting a datacenter map from a datacenter management system, displaying at least a portion of the map on a mobile device display, and displaying the mobile device location on the at least a portion of the map; and
    the mobile device obtaining an equipment location of an equipment in the datacenter from the datacenter management system, displaying directions from the mobile device location to the equipment location, displaying the equipment location on the at least a portion of the map if it fits in the display, and displaying a photograph of the equipment location and a photograph of the equipment, wherein the equipment is a malfunctioning equipment, and wherein the method comprises causing the malfunctioning equipment to provide some physical manifestation that indicates an identity of the malfunctioning equipment, including causing the malfunctioning equipment to provide a visual output, which comprises causing the malfunctioning equipment to flash a network interface card.

2. The method of claim 1 further comprising:
    updating the location of the mobile device as the user moves in the datacenter; and
    updating the directions from the mobile device location to the equipment location as the user moves in the datacenter.

3. The method of claim 2 further comprising:
    in response to a user request, the mobile device causing the identification prober to obtain information from an identification provider affixed to an equipment rack, and transmitting the information to the datacenter management system;

the datacenter management system transmitting a photographic image of the equipment rack to the mobile device; and the mobile device displaying the image.

4. The method of claim 2 further comprising:
in response to a user request, the datacenter management system causing the equipment to provide an auditory or visual output.

5. The method of claim 2 further comprising:
in response to a user request, the mobile device causing the identification prober to obtain information from an identification provider affixed to the equipment; and
transmitting the information to the datacenter management system.

6. The method of claim 2 further comprising:
in response to a user request, the datacenter management system collecting logs from the equipment.

7. The method of claim 5 further comprising:
in response to a user request, the datacenter management system making the equipment ready for replacement.

8. The method of claim 1 further comprising:
in response to a user request, the mobile device displaying an identifier of the equipment.

9. The method of claim 7 further comprising:
in response to a user request, the mobile device causing the identification prober to obtain information from an identification provider affixed to a replacement equipment; and
transmitting the information to the datacenter management system.

10. The method of claim 7 further comprising:
in response to a user request, the mobile device confirming installation of the replacement equipment.

11. The method of claim 10 further comprising:
in response to a user request, the mobile device confirming activation of the replacement equipment.

12. The method of claim 1 wherein the identification prober is a radio frequency identification (RFID) reader and the identification providers are RFID tags.

13. The method of claim 3 wherein the identification prober is a radio frequency identification (RFID) reader and the identification providers are RFID tags.

14. The method of claim 5 wherein the identification prober is a radio frequency identification (RFID) reader and the identification providers are RFID tags.

15. The method of claim 9 wherein the identification prober is a radio frequency identification (RFID) reader and the identification providers are RFID tags.

16. The method of claim 1 wherein the identification prober is a camera and the identification providers are barcodes.

17. The method of claim 3 wherein the identification prober is a camera and the identification providers are barcodes.

18. The method of claim 5 wherein the identification prober is a camera and the identification providers are barcodes.

19. The method of claim 1, wherein the photograph of the equipment location comprises a photograph of a rack, a chassis of the rack and a slot in the chassis at which the equipment is located.

20. The method of claim 1, wherein causing the malfunctioning equipment to provide some physical manifestation that indicates the identity of the malfunctioning equipment comprises causing the malfunctioning equipment to provide an audio output.

21. The method of claim 20, wherein causing the malfunctioning equipment to provide the audio output comprises causing the malfunctioning equipment to sound a speaker.

22. The method of claim 1, wherein the mobile device obtaining the equipment location of the equipment in the datacenter from the datacenter management system, displaying directions from the mobile device location to the equipment location, displaying the equipment location on the at least a portion of the map if it fits in the display, and displaying the photograph of the equipment location and the photograph of the equipment comprises the mobile device displaying a photograph of a server location and a photograph of a server.

23. A method for managing a datacenter using a mobile device, which method comprises:
in response to a user request, determining a mobile device location in the datacenter using wireless signals received by the mobile device;
the mobile device requesting a datacenter map from a datacenter management system, displaying at least a portion of the map on a mobile device display, and displaying the mobile device location on the at least a portion of the map; and
the mobile device obtaining an equipment location of an equipment in the datacenter from the datacenter management system, displaying directions from the mobile device location to the equipment location, displaying the equipment location on the at least a portion of the map if it fits in the display, and displaying a photograph of the equipment location and a photograph of the equipment,
wherein the equipment is a malfunctioning equipment, and wherein the method comprises causing the malfunctioning equipment to provide some physical manifestation that indicates an identity of the malfunctioning equipment, including causing the malfunctioning equipment to provide a visual output, which comprises causing the malfunctioning equipment to flash a network interface.

24. Apparatus for managing a datacenter which includes identification providers attached to equipment and one or more identification providers disposed at predetermined locations in the datacenter, which apparatus comprises:
a mobile device in communication with an identification prober;
wherein the mobile device is operable, in response to a user request, to cause the identification prober to obtain information from the one or more of a plurality of identification providers, and to determining a mobile device location in the datacenter therefrom;
wherein the mobile device is further operable to request a datacenter map from a datacenter management system, to display at least a portion of the map on a mobile device display, and to display the mobile device location on the at least a portion of the map;
wherein the mobile device is further operable to obtain an equipment location of an equipment in the datacenter from the datacenter management system, to display directions from the mobile device location to the equipment location, to display the equipment location on the at least a portion of the map if it fits in the display, and to display a photograph of the equipment location and a photograph of the equipment; and
wherein the equipment is a malfunctioning equipment, wherein the mobile device is further operable to cause the malfunctioning equipment to provide some physical manifestation that indicates an identity of the malfunctioning equipment, and wherein the mobile device is further operable to cause the malfunctioning equipment to provide a visual output, which comprises flashing of a network interface.

25. The apparatus of claim 24 wherein:

the mobile device is further operable to update the location of the mobile device as the user moves in the datacenter; and to update the directions from the mobile device location to the equipment location as the user moves in the datacenter.

26. The apparatus of claim 25 wherein:

the mobile device is further operable, in response to a user request, to cause the identification prober to obtain information from an identification provider affixed to an equipment rack, and to transmit the information to the datacenter management system;

to receive a photographic image of the equipment rack from the datacenter management system; and to display the image.

27. The apparatus of claim 25 wherein:

the mobile device is further operable, in response to a user request, to cause the identification prober to obtain information from an identification provider affixed to the equipment; and to transmit the information to the datacenter management system.

28. The apparatus of claim 27 wherein:

the mobile device is further operable, in response to a user request, to cause the identification prober to obtain information from an identification provider affixed to a replacement equipment; and to transmit the information to the datacenter management system.

29. The apparatus of claim 28 wherein:

the mobile device is further operable, in response to a user request, to confirm installation of the replacement equipment.

30. The apparatus of claim 29 wherein:

the mobile device is further operable, in response to a user request, to confirm activation of the replacement equipment.

* * * * *